US012341304B2

(12) United States Patent
Lee et al.

(10) Patent No.: US 12,341,304 B2
(45) Date of Patent: Jun. 24, 2025

(54) COMMUNICATION APPARATUS HAVING MONITORING FUNCTION FOR COUPLING STATE OF CONNECTOR AND METHOD OF CONTROLLING THE SAME

(71) Applicant: SAMSUNG ELECTRONICS CO., LTD., Suwon-si (KR)

(72) Inventors: Hanyeop Lee, Suwon-si (KR); Jisang Kim, Suwon-si (KR); Jongin Lee, Suwon-si (KR); Jinchul Choi, Suwon-si (KR); Changho Hwang, Suwon-si (KR); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 17/965,669

(22) Filed: Oct. 13, 2022

(65) Prior Publication Data

US 2023/0086824 A1 Mar. 23, 2023

Related U.S. Application Data

(63) Continuation of application No. PCT/KR2022/011927, filed on Aug. 10, 2022.

(30) Foreign Application Priority Data

Sep. 23, 2021 (KR) ........................ 10-2021-0125579

(51) Int. Cl.
*H01R 24/54* (2011.01)
*H01R 12/51* (2011.01)

(52) U.S. Cl.
CPC ........... *H01R 24/54* (2013.01); *H01R 12/515* (2013.01)

(58) Field of Classification Search
CPC .............................. H01R 24/54; H01R 12/515
(Continued)

(56) References Cited

U.S. PATENT DOCUMENTS 5,604,315 A * 2/1997 Briefer ..................... G01N 9/26 73/718
7,293,122 B1 11/2007 Schubert et al.
(Continued)

FOREIGN PATENT DOCUMENTS

JP H07-191080 A 7/1995
JP H11-132215 5/1999
(Continued)

OTHER PUBLICATIONS

PCT International Search Report dated Nov. 18, 2022 for PCT/KR2022/011927.

*Primary Examiner* — Harshad C Patel
(74) *Attorney, Agent, or Firm* — Nixon & Vanderhye P.C.

(57) ABSTRACT

A communication apparatus having a monitoring function for a coupling state of a connector and/or a method of controlling the communication apparatus are provided. According to various example embodiments, a communication device may include an RF connector portion detachably coupled with a cable connector portion of one end of a cable for transmitting an antenna signal, at least one capacitor disposed near the RF connector portion, and a controller (comprising circuitry) for monitoring a coupling state between the cable connector portion and the RF connector portion based on a capacitance of the at least one capacitor.

17 Claims, 12 Drawing Sheets

(58) Field of Classification Search
USPC .......................................................... 439/578
See application file for complete search history.

(56) References Cited

U.S. PATENT DOCUMENTS

| | | | | |
|---|---|---|---|---|
| 7,733,236 | B2 | 6/2010 | Montena et al. | |
| 8,011,950 | B2 * | 9/2011 | McGrath | H01R 13/6594 439/497 |
| 8,361,896 | B2 * | 1/2013 | De Geest | H05K 1/0231 438/607 |
| 8,371,882 | B1 * | 2/2013 | Szczesny | H01R 12/722 439/660 |
| 8,884,726 | B2 * | 11/2014 | Sun | H01H 1/0036 333/262 |
| 8,928,849 | B2 * | 1/2015 | Horino | G02F 1/13452 349/149 |
| 9,054,440 | B2 * | 6/2015 | Taylor | H01R 27/02 |
| 9,071,249 | B2 * | 6/2015 | Guard | G06F 3/0443 |
| 2011/0087805 | A1 * | 4/2011 | Liu | G06F 13/4081 710/14 |
| 2013/0335258 | A1 * | 12/2013 | Chung | H04B 1/3838 342/27 |
| 2015/0171911 | A1 * | 6/2015 | Yang | H04W 4/80 455/280 |

FOREIGN PATENT DOCUMENTS

| | | | |
|---|---|---|---|
| KR | 10-2009-0109373 | A | 10/2009 |
| KR | 10-2011-0034581 | A | 4/2011 |
| KR | 10-2014-0073105 | A | 6/2014 |
| KR | 10-2018-0054230 | | 5/2018 |
| KR | 10-1890383 | | 8/2018 |
| KR | 10-2013675 | | 8/2019 |
| KR | 10-2020-0073478 | A | 6/2020 |

* cited by examiner

| Cap_1 | Cap_2 | Out |
|---|---|---|
| L | L | L |
| H | L | L |
| L | H | L |
| H | H | H |

COMMUNICATION APPARATUS HAVING MONITORING FUNCTION FOR COUPLING STATE OF CONNECTOR AND METHOD OF CONTROLLING THE SAME

CROSS-REFERENCE TO RELATED APPLICATIONS

This application is a PCT-Bypass of International Application No. PCT/KR2022/011927 designating the United States, filed on Aug. 10, 2022, in the Korean Intellectual Property Receiving Office and claiming priority from Korean Patent Application No. 10-2021-0125579, filed on Sep. 23, 2021, in the Korean Intellectual Property Office, the disclosures of which are incorporated by reference herein in their entireties.

BACKGROUND

1. Field

The disclosure relates to a communication apparatus having a monitoring function for a coupling state of a connector and/or a method of controlling the communication apparatus.

2. Description of Related Art

A radio frequency (RF) front end of a communication device and an antenna may be connected by a cable. A cable connector of one end of the cable may be coupled with a connector of the antenna, and a cable connector of the other end of the cable may be coupled with a connector of the RF front end. An antenna signal may be transmitted to the RF front end by the coupling and the cable. If coupling of the connectors is bad, the performance of the communication device may decrease or a malfunction may occur. Conventionally, abnormal coupling of the connectors is detected with indirect methods using the strength of the antenna signal.

SUMMARY

Since there may be various causes of a malfunction of an antenna signal, such as the logic and software algorithm creating the antenna signal, an accurate cause of a defect may be difficult to identify. When the defect occurs in a manufacturing process and a market, a sample is disassembled and reassembled to identify the cause of the defect, which increases costs and manufacturing process time, and leads to loss of service time and increased cost due to a delay in market defect analysis.

According to various example embodiments, a communication device may include an RF connector portion detachably coupled with a cable connector portion of one end of a cable for transmitting an antenna signal, at least one capacitor disposed near the RF connector portion, and a controller (comprising circuitry) for monitoring a coupling state between the cable connector portion and the RF connector portion based on a capacitance of the at least one capacitor.

According to various example embodiments, the communication device may be detachably coupled with the cable connector portion of one end of the cable for transmitting the antenna signal, and may include the RF connector portion including a plurality of openings penetrating an inner area and optionally an outer area, a plurality of capacitors disposed near the plurality of openings in the interior area, and the controller for monitoring the coupling state between the cable connector portion and the RF connector portion based on the capacitance of a plurality of capacitors.

According to various example embodiments, a method of controlling the communication device may include measuring the capacitance of at least one capacitor disposed near the RF connector portion and monitoring the coupling state between the RF connector portion and the cable connector portion based on the capacitance of at least one capacitor, and the cable connector portion may be disposed in one end of the cable for transmitting the antenna signal.

By detecting abnormal coupling of the connector (e.g., non-coupling or incomplete coupling), process time and cost, caused by disassembly and assembly of the communication device following an assembly of the communication device in an abnormal coupling state, may be reduced. Also, before or when a market defect occurs, an abnormality of the connector may be diagnosed without disassembling the sample, so defect analysis time and cost may be reduced.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
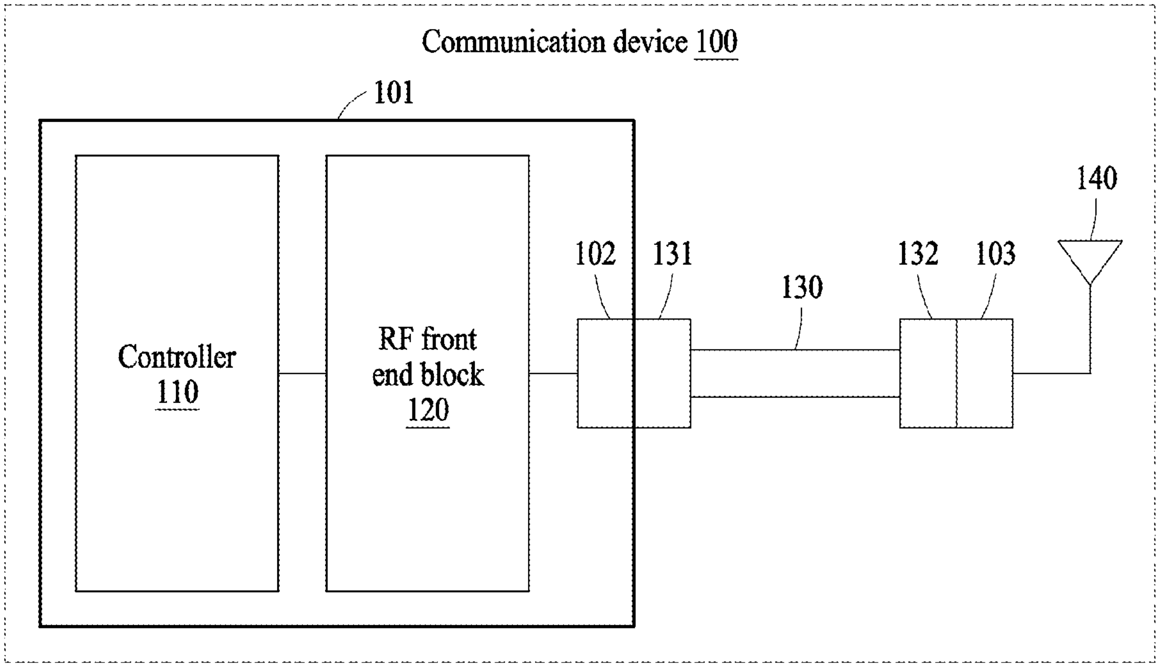
FIG. 1 illustrates a structure of a communication device according to various example embodiments.

Hereinafter, various example embodiments will be described in detail with reference to the accompanying drawings. When describing the example embodiments with reference to the accompanying drawings, like reference numerals refer to like elements and a repeated description related thereto has been omitted. Each embodiment herein may be used in combination with any other embodiment(s) herein.

FIG. 1 illustrates a structure of a communication device according to various example embodiments. Referring to FIG. 1, a communication device 100 may include a controller 110, a radio frequency (RF) front end block 120, a cable 130, and an antenna 140. For example, the communication device 100 may be a network equipment (e.g., customer premises equipment (CPE)). The controller 110 and the RF front end block 120 may be mounted on a circuit board (e.g., a printed circuit board (PCB)) 101. The controller 110 (including circuitry) may include at least one processor (not shown) and at least one memory (not shown). The at least one processor may include an application processor (AP) and a communication processor (CP). At least one memory may include a cache memory, a flash memory, and a DRAM. According to various example embodiments, the communication device 100 may include not only components illustrated in FIG. 1 but also other components, such as a power supplier and a communication transceiver.

The cable 130 may transmit a signal of the RF front end block 120 to the antenna 140 or may transmit a signal of the antenna 140 to the RF front end block 120. For example, the cable 130 may be a coaxial cable. A signal transmitted to the antenna 140 through the cable 130 and a signal provided to the cable 130 from the antenna 140 may be referred to as an antenna signal. One end of the cable 130 may include a cable connector portion 131 and the other end of the cable 130 may include a cable connector portion 132. The cable connector portions 131 and 132 may correspond to coaxial connector plugs. The cable connector portion 131 may be coupled with an RF connector portion 102, and the cable connector portion 132 may be coupled with an antenna connector portion 103. The RF connector portion 102 may correspond to or include a coaxial connector receptacle (receptable) in certain example embodiments. The RF connector portion 102 may be mounted on the circuit board 101.

When a coupling between the cable connector portion 131 and the RF connector portion 102 and a coupling between the cable connector portion 132 and the antenna connector portion 103 are both in a normal state, the antenna signal may be normally transmitted. The controller 110 may monitor a coupling state between the cable connector portion 131 and the RF connector portion 102 using at least one capacitor (not shown) disposed near the RF connector portion 102. For example, the controller 110 may detect a bad coupling based on a change of a capacitance. The controller 110 may take an appropriate action when a coupling state is bad. For example, the controller 110 may limit a communication function and/or notify a user of a bad coupling. Accordingly, the user may simply diagnose the bad coupling without additional operations.

Figure 2:
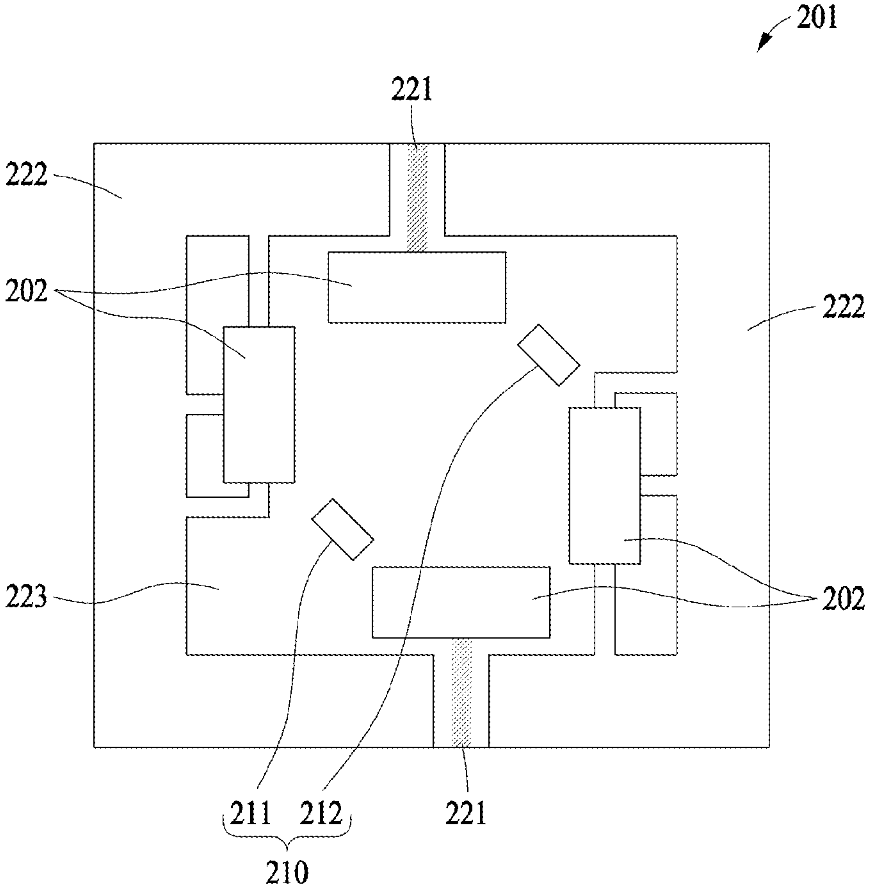
FIG. 2 illustrates an arrangement of capacitors according to various example embodiments.

FIG. 2 illustrates an arrangement of capacitors according to various example embodiments. Referring to FIG. 2, capacitors 210 may be disposed near a connector pad 202. The connector pad 202 may fix the RF connector portion (e.g., the RF connector portion 102) to a circuit board 201 (e.g., the circuit board 101). The circuit board 201 may include a PCB RF wire 221, a PCB outer layer area 222, and a PCB fill-cut area 223. The capacitors 210 and the connector pad 202 may be disposed on the circuit board 201 through surface mount technology (SMT). The capacitors 210 may be spaced apart from the connector pad 202 and disposed near the connector pad 202. Spaced arrangement may reduce a risk of an occurrence of a mounting defect and a risk of a change in capacitance characteristics of the capacitors 210. The capacitors 210 may include a first capacitor 211 and a second capacitor 212. Hereinafter, a structure and operation using the first capacitor 211 and the second capacitor 212 will be described, but the structure and operation may also use one capacitor or three capacitors.

Figure 3A:
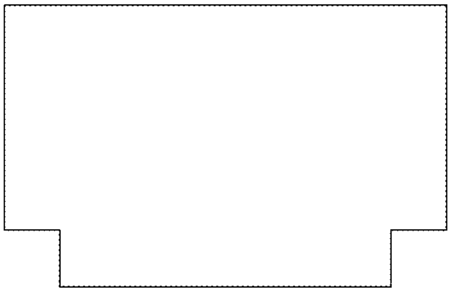
FIGS. 3A, 3B, and 3C illustrate a structure of a radio frequency (RF) connector portion according to various example embodiments.
Figure 3B:
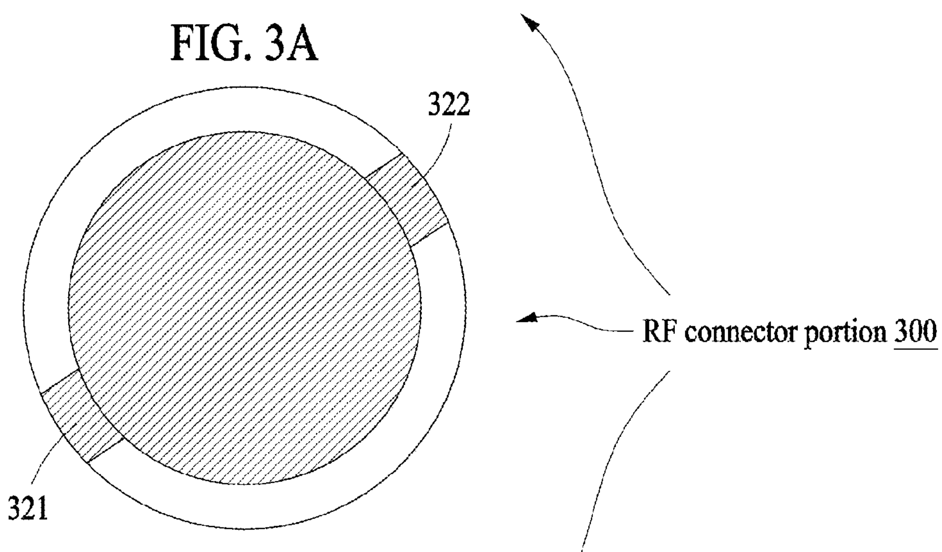
Figure 3C:
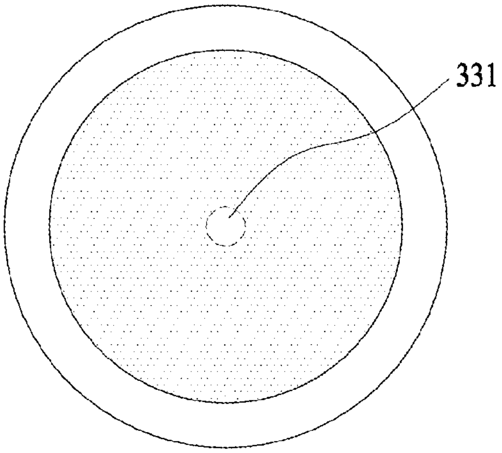

FIGS. 3A-3C illustrate a structure of an RF connector portion according to various example embodiments. The RF connector portion includes a connector (including at least one of a connector terminal and/or a connector receptacle). FIG. 3A illustrates a side view of an RF connector portion 300, FIG. 3B illustrates a bottom surface view of the RF connector portion 300, and FIG. 3C illustrates a plan view of the RF connector portion 300. At a lower part of the RF connector portion 300, openings 321 and 322 penetrating the inner area of the RF connector portion 300 and optionally the outer area of the RF connector portion 300 may be formed. The openings 321 and 322 may be located opposite from each other in the RF connector portion 300. The number of openings 321 and 322 may correspond to the number of capacitors (e.g., capacitors 210), and the capacitors may be located near the openings 321 and 322. A terminal 331 may be formed at the center of the inner area. When the RF connector portion 300 and the cable connector portion (e.g., the cable connector portion 131) are coupled, an antenna signal may be transmitted by a connection between the terminal 331 of the RF connector portion 300 and a terminal (not shown) of the cable connector portion.

Figure 4A:
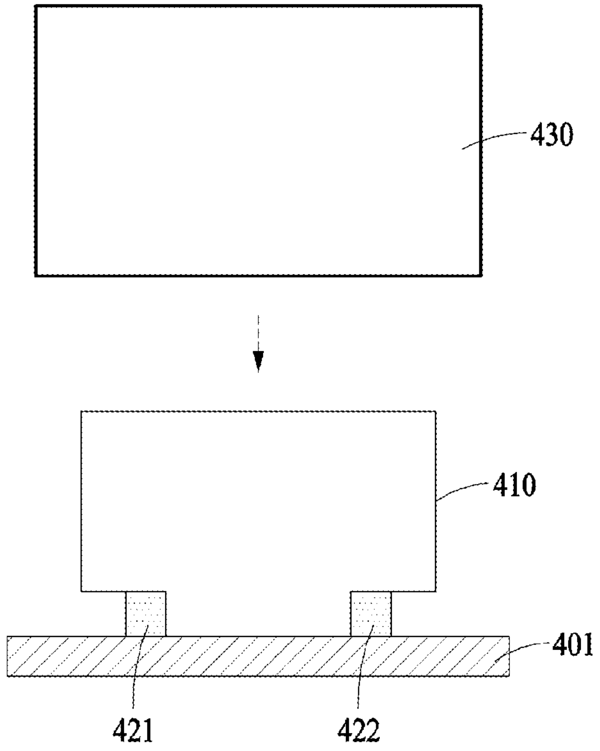
FIGS. 4A and 4B illustrate a coupling of the RF connector portion and a cable connector portion according to various example embodiments.
Figure 4B:
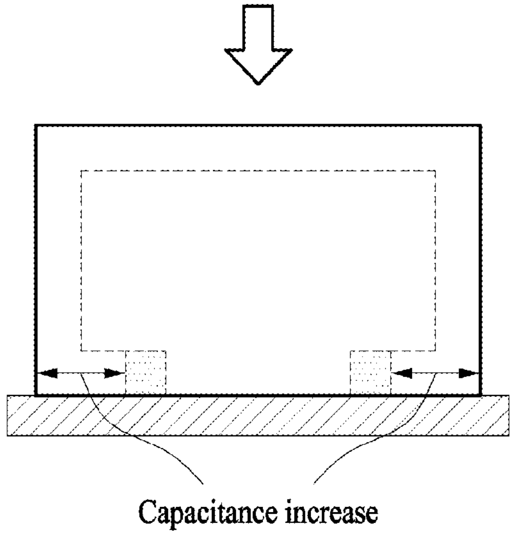

FIGS. 4A-4B illustrate a coupling of the RF connector portion and a cable connector portion according to various example embodiments. Referring to FIG. 4A, an RF connector portion 410 (e.g., the RF connector portion 102 and the RF connector portion 300) and capacitors 421 and 422 (e.g., capacitors 210) may be mounted on a surface of a circuit board 401 (e.g., the circuit board 101 and the circuit board 201). The capacitors 421 and 422 may be disposed near the RF connector portion 410. Openings (e.g., the openings 321 and 322) may be formed at the lower part of the RF connector portion 410, and the capacitors 421 and 422 may be disposed near the openings. The openings may be located opposite from each other in the RF connector portion 410; the capacitor 421 may be located near one of them, and the capacitor 422 may be located near one of the remaining ones. A cable connector portion 430 (e.g., the cable connector portion 131) may be coupled with the RF connector portion 410 in a form of surrounding the RF connector portion 410.

FIG. 4B illustrates a state in which the RF connector portion 410 and the cable connector portion 430 are normally coupled. As the cable connector portion 430 approaches the capacitors 421 and 422, a metal component of the cable connector portion 430 may affect the capacitors 421 and 422, and the capacitance of the capacitors 421 and 422 may increase. The capacitance may change according to a coupling state between the RF connector portion 410 and the cable connector portion 430 and/or a positional relationship between the cable connector portion 430 and the capacitors 421 and 422. For example, the capacitance may have the highest value in a normal coupling state and may have a lower value compared to that of the normal coupling during bad coupling, such as non-coupling or incomplete coupling. The difference between these capacitance values may be used to estimate the coupling state. Based on a change of the capacitance of the capacitors 421 and 422, a bad coupling between the cable connector portion 430 and the RF connector portion 410 may be detected.

Incomplete coupling may refer to a state in which a lower surface of the cable connector portion 430 is coupled to the RF connector portion 410 while tilted non-parallel to the circuit board 401, and non-coupling may refer to a state in which the RF connector portion 410 and the cable connector portion 430 are not coupled or a state in which the coupling is undone. For example, bad coupling may occur due to a mistake in the product assembly process and/or physical shock after product installation.

Figure 5:
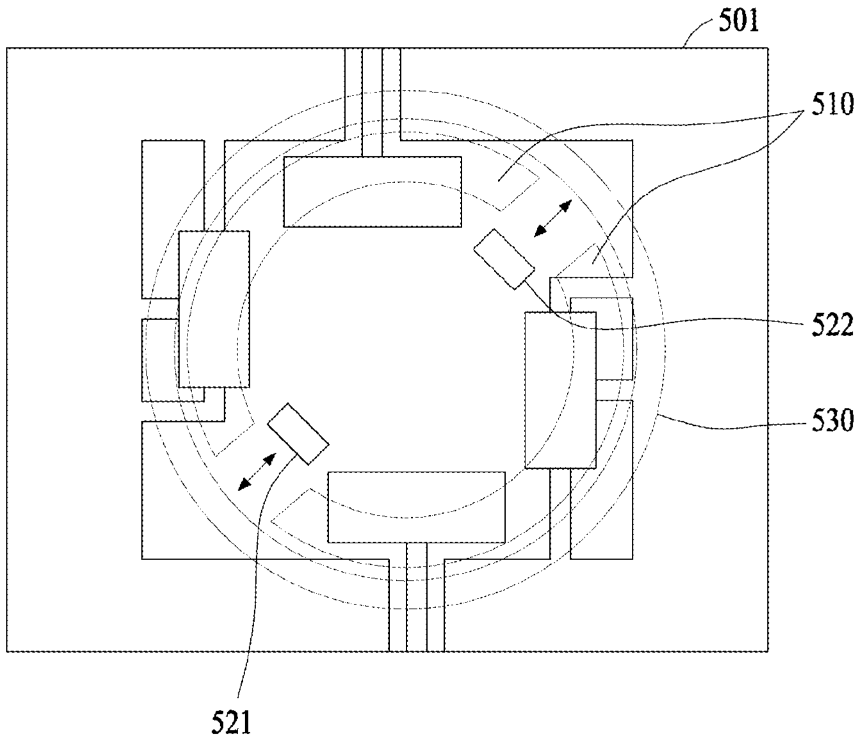
FIG. 5 illustrates an arrangement of the capacitors and openings according to various example embodiments.

FIG. 5 illustrates an arrangement of the capacitors and openings according to various example embodiments. Referring to FIG. 5, an RF connector portion 510 (e.g., the RF connector portion 102, the RF connector portion 300, and the RF connector portion 410) may be mounted on a surface of a circuit board 501 (e.g., the circuit board 101, the circuit board 201, and the circuit board 401) via a connector pad (e.g., the connector pad 202). Capacitors 521 and 522 (e.g., the capacitors 210 and the capacitors 421 and 422) may be disposed near the openings (e.g., 321 and 322) of the inner area of the RF connector portion 510. When a cable connector portion 530 (e.g., the cable connector portion 131 and the cable connector portion 430) is coupled with the RF connector portion 510 in a form of surrounding the RF connector portion 510, the capacitors 521 and 522 may be affected by the metal component of the cable connector portion 530 through the openings.

Figure 6:
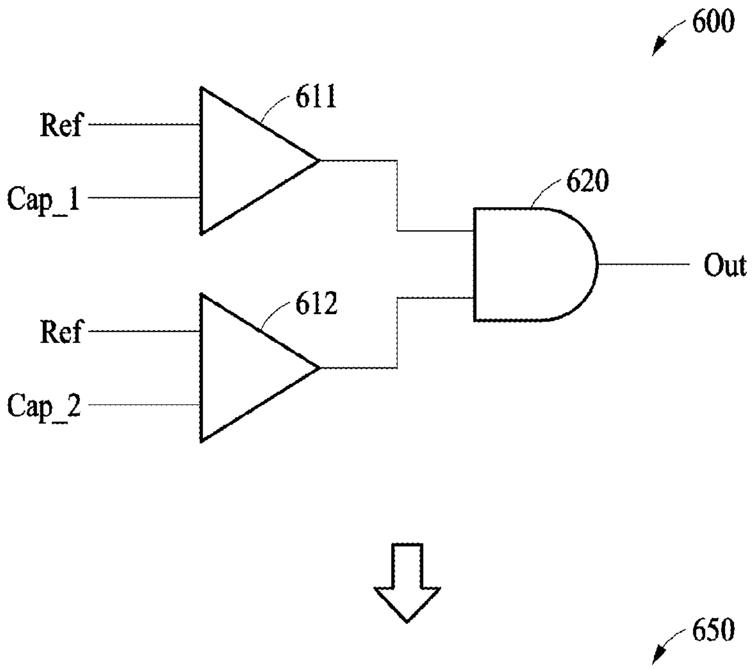
FIG. 6 illustrates a structure of a comparison circuit according to various example embodiments.

FIG. 6 illustrates a structure 650 of a comparison circuit according to various example embodiments. The communication device (e.g., the communication device 100) may include a comparison circuit 600, and a controller (e.g., the controller 110) may detect a bad coupling using the comparison circuit 600. The comparison circuit 600 may be part of the controller. For example, the controller may compare a first capacitance value Cap_1 and a second capacitance value Cap_2 with a reference value Ref, and if at least one of the first capacitance value Cap_1 and the second capacitance value Cap_2 is less than the reference value Ref, it may be determined that the coupling between the RF connector portion (e.g., the RF connector portion 102, the RF connector portion 300, the RF connector portion 410, the RF connector portion 510) and the cable connector portion (e.g., the cable connector portion 131, the cable connector portion 430, and the cable connector portion 530) is bad.

Referring to FIG. 6, the comparison circuit 600 may include a first comparator 611, a second comparator 612, and an AND gate 620. The first comparator 611 may compare the first capacitance value Cap_1 with the reference value Ref, and the second comparator 612 may compare the second capacitance value Cap_2 with the reference value Ref. The reference value Ref for the first comparator 611 and the reference value Ref for the second comparator 612 may be the same or different. The capacitance values Cap_1 and Cap_2 may be measured through the capacitors (e.g., the capacitors 210), the capacitors 421 and 422, and the capacitors 521 and 522. The reference value Ref may be preset as a value with which a normal coupling state and a bad coupling state may be distinguished. For example, in a calibration operation, a capacitance value in a normally coupled state may be measured through each capacitor, and the reference value Ref may be set as less than the corresponding capacitance value.

The AND gate 620 may determine an output value Out based on a comparison result of the comparators 611 and 612. The comparators 611 and 612 may output a logical high (H) value if the capacitance values Cap_1 and Cap_2 are greater than the reference value Ref, and may output a logical low (L) value if the capacitance values Cap_1 and Cap_2 are less than the reference values Ref. If at least one of the first capacitance value Cap_1 and the second capacitance value Cap_2 is less than the reference value Ref, the output value Out may be determined as L, and if both the first capacitance value Cap_1 and the second capacitance value Cap_2 are greater than the reference value Ref, the output value Out may be determined as H. An output value Out of L may indicate a bad coupling, and an output value Out of H may indicate a normal coupling. A state in which one of the first capacitance value Cap_1 and the second capacitance value Cap_2 is less than the reference value Ref may correspond to incomplete coupling, and a state in which the first capacitance value Cap_1 and the second capacitance value Cap_2 are both less than the reference value (Ref) may correspond to non-coupling.

Figure 7A:
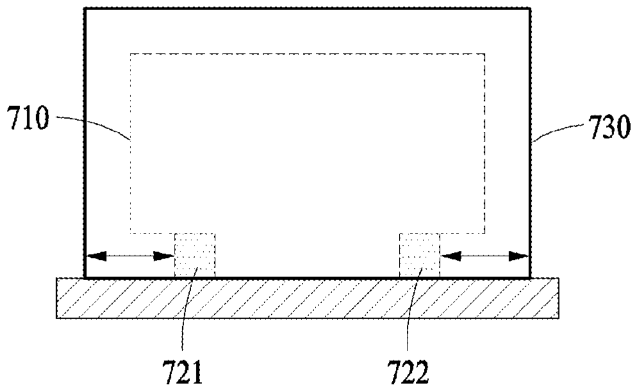
FIGS. 7A and 7B compare a normal coupling and a bad coupling according to various example embodiments.
Figure 7B:
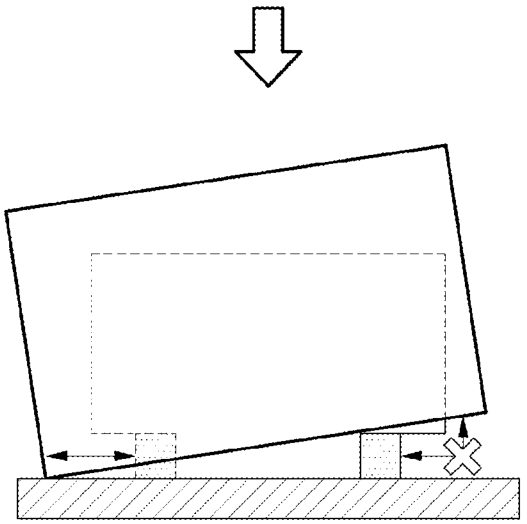

FIGS. 7A-7B compare a normal coupling and a bad coupling according to various example embodiments. FIG. 7A may illustrate a normal coupling state. If an RF connector portion 710 (e.g., the RF connector portion 102, the RF connector portion 300, the RF connector portion 410, and the RF connector portion 510) and a cable connector portion 730 (e.g., the cable connector portion 131, the cable connector portion 430, and the cable connector portion 530) are normally coupled, the capacitance of capacitors 721 and 722 (e.g., the capacitors 210, the capacitors 421 and 422, and the capacitors 521 and 522) may be indicated greater than the reference value. FIG. 7B may illustrate a bad coupling state. Bad coupling may occur when the RF connector portion 710 and the cable connector portion 730 are incorrectly coupled during product assembly process, or when a coupling between the RF connector portion 710 and the cable connector portion 730 is at least partially undone due to physical shock after product application. In a badly coupled state, at least one of the capacitances of capacitors 721 and 722 may be indicated to be less than the reference value.

Figure 8:
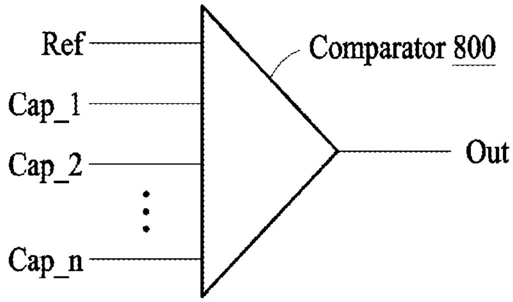
FIG. 8 illustrates a comparator using a multi input according to various example embodiments.

FIG. 8 illustrates a comparator using a multi input according to various example embodiments. The communication device (e.g., the communication device 100) may include a comparator 800, and the controller (e.g., the controller 110) may detect a coupling defect using the comparator 800. Referring to FIG. 8, the comparator 800 may determine the output value Out based on the reference value Ref and n capacitance values from Cap_1 to Cap_n. The n capacitance values from Cap_1 to Cap_n may be measured through n capacitors. According to the above-described example embodiment, n=2 may be possible. However, n may be a number other than 2. The comparator 800 may determine the output value Out as L if any of the capacitance values from Cap_1 to Cap_n is less than the reference value Ref. The reference value Ref may be predetermined via a calibration using n capacitors.

Figure 9:
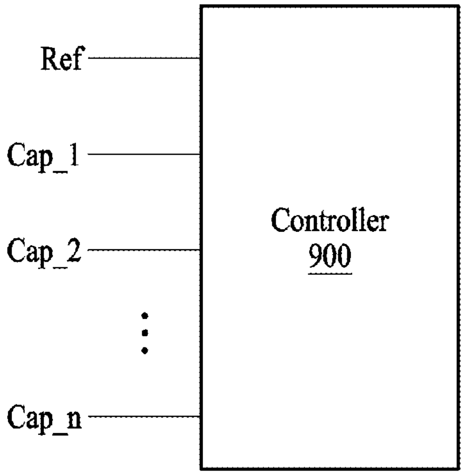
FIG. 9 illustrates a controller having a built-in comparator according to various example embodiments.

FIG. 9 illustrates a controller having a built-in comparator according to various example embodiments. Referring to FIG. 9, a comparison operation may be performed by a controller 900 (e.g., the controller 110) without a separate circuit configuration such as the comparison circuit 600 or the comparator 800. The comparison operation may be built in as logic in the controller 900. The controller 900 may determine the output value Out based on the reference value Ref and the n capacitance values Cap_1 to Cap_n. The controller 900 may determine the output value Out as L if any of the capacitance values Cap_1 to Cap_n is less than the reference value Ref.

Figure 10:
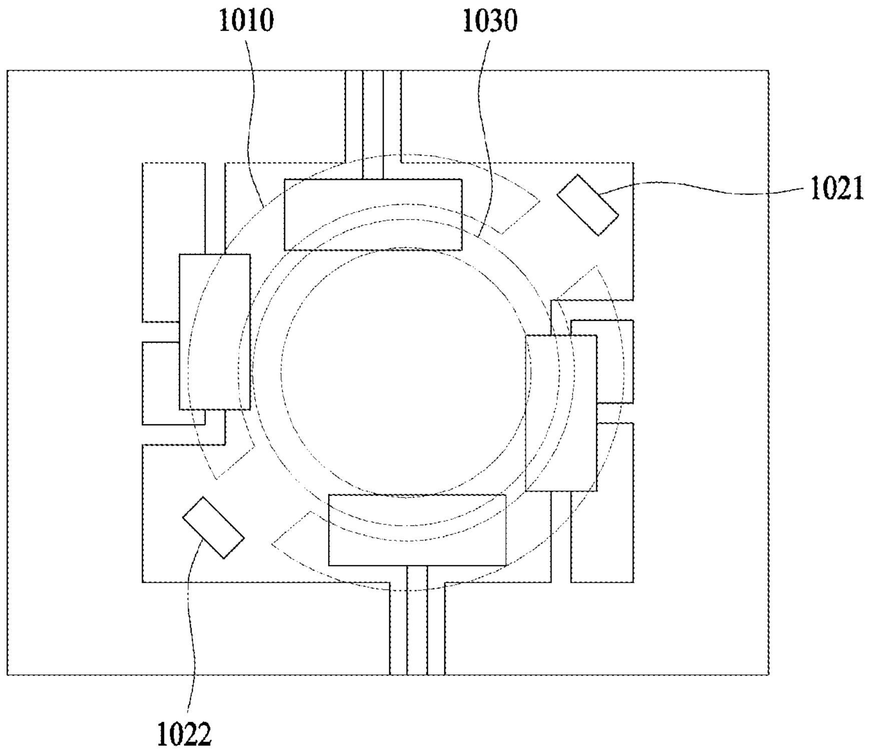
FIGS. 10 and 11 illustrate a coupling relationship between the RF connector portion and the cable connector portion and an arrangement of the capacitors according to various example embodiments.
Figure 11:
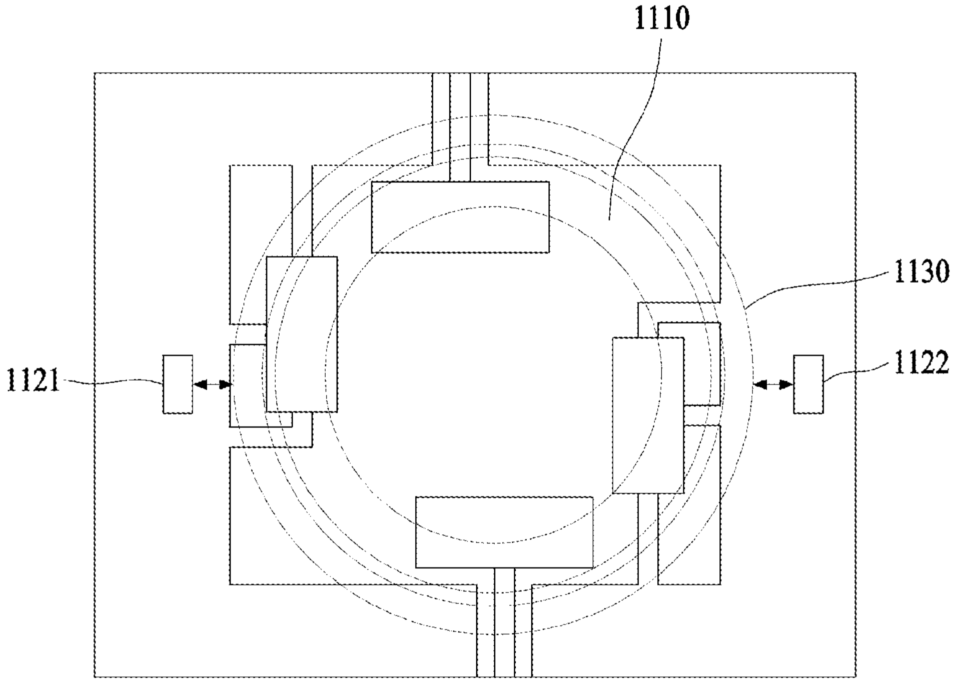

FIGS. 10 and 11 illustrate a coupling relationship between the RF connector portion and the cable connector portion and an arrangement of the capacitors according to various example embodiments. Referring to FIG. 10, unlike FIGS. 4 and 5, an RF connector portion 1010 (e.g., the RF connector portion 102, the RF connector portion 300, the RF connector portion 410, the RF connector portion 510, and the RF connector portion 710) may be coupled with a cable connector portion 1030 (e.g., the cable connector portion 131, the cable connector portion 430, the cable connector portion 530, and the cable connector portion 730) in a form in which the RF connector portion 1010 surrounds the cable connector portion 1030. In this case, capacitors 1021 and 1022 (e.g., the capacitors 210, the capacitors 421 and 422, and the capacitors 521 and 522, and the capacitors 721 and 722) may be located in an outer area of the RF connector portion 1010. The capacitors 1021 and 1022 may be affected by the cable connector portion 1030 through the opening of the RF connector portion 1010.

Referring to FIG. 11, a cable connector portion 1130 (e.g., the cable connector portion 131, the cable connector portion 430, the cable connector portion 530, the cable connector portion 730, and the cable connector portion 1030), an RF connector portion 1110 (e.g., the RF connector portion 102, the RF connector portion 300, the RF connector portion 410, the RF connector portion 510, the RF connector portion 710, and the RF connector portion 1010), and capacitors 1121 and 1122 (e.g., the capacitors 210, the capacitors 421 and 422, the capacitors 521 and 522, the capacitors 721 and 722, and the capacitors 1021 and 1022) may be arranged differently from FIGS. 4, 5, and 10. As shown in FIGS. 4 and 5, the RF connector portion 1110 may be coupled with the cable connector portion 1130 in a form in which the cable connector portion 1130 surrounds the RF connector portion 1110, but as shown in FIG. 10, the capacitors 1121 and 1122 may be disposed in an outer area of the RF connector portion 1110. In this case, since the RF connector portion 1110 is not disposed between the capacitors 1121 and 1122 and the cable connector portion 1130, an opening may not be formed in the RF connector portion 1110, and the capacitors 1121, 1122 may be directly affected by the cable connector portion 1130 that does not pass through the opening.

Figure 12:
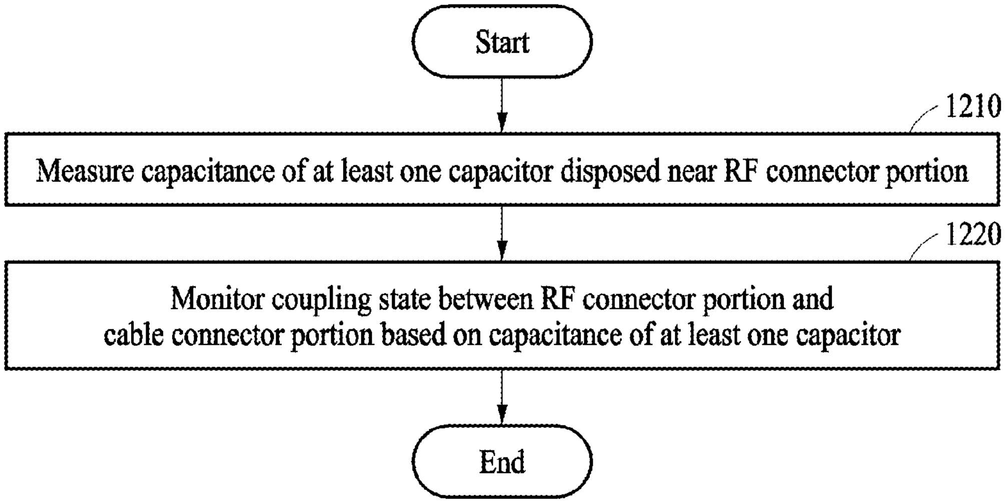
FIG. 12 is a flowchart illustrating control operations of a communication device according to various example embodiments.

FIG. 12 is a flowchart illustrating control operations of a communication device according to various example embodiments. Operations 1210 and 1220 may be performed by at least one component (e.g., the controller 110) of the communication device 100. Referring to FIG. 12, in the operation 1210, the capacitance of at least one capacitor disposed near the RF connector portion may be measured. In the operation 1220, a coupling state between the RF connector portion and the cable connector portion may be monitored based on the capacitance of at least one capacitor. The cable connector portion may be disposed at one end of a cable for transmitting an antenna signal.

In the RF connector portion, a plurality of openings penetrating an inner area of the RF connector portion and an outer area of the RF connector portion may be formed. The plurality of openings may include a first opening and a second opening located opposite from each other in the RF connector portion, and the at least one capacitor may include the first capacitor located near the first opening and the second capacitor located near the second opening. The operation 1220 may include an operation in which the first capacitance and the second capacitance are each compared with the reference value, and an operation determining that a coupling between the cable connector portion and the RF connector portion is bad, if at least one of the first capacitance and the second capacitance is less than the reference value.

Figure 13:
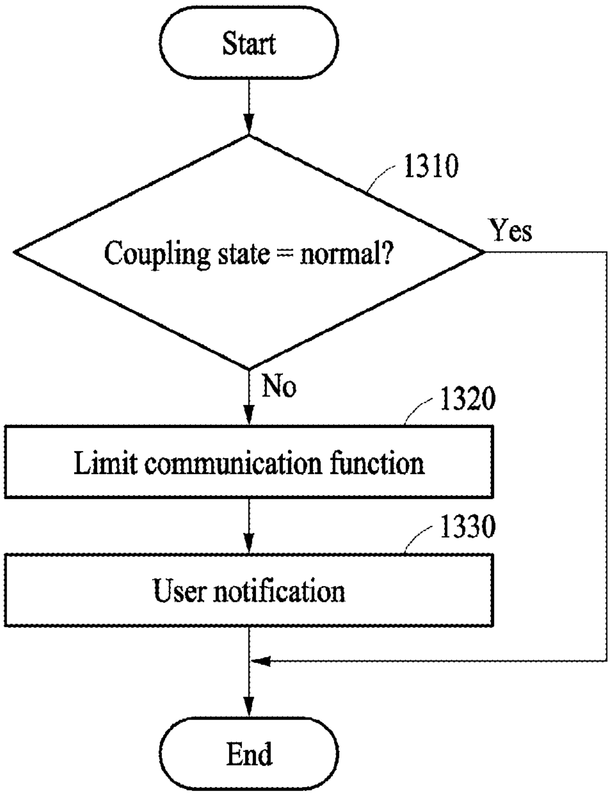
FIG. 13 is a flowchart illustrating control operations corresponding to a bad coupling according to various example embodiments.

FIG. 13 is a flowchart illustrating control operations corresponding to a bad coupling according to various example embodiments. Operations 1310 to 1330 may be performed by at least one component (e.g., the controller 110) of the communication device 100. The operations 1310 to 1330 may be performed sequentially or non-sequentially. For example, the order of operations 1320 and 1330 may be changed, and/or operations 1320 and 1330 may be performed in parallel. In the operation 1310, it is determined whether the coupling state is normal. When the coupling state is not normal; that is, when the coupling state is bad, the communication function may be limited in operation 1320, and a user notification may be performed in operation 1330. For example, the AP may prohibit the output of RF power to the CP, and may notify the user of occurrence of a bad coupling.

Each embodiment herein may be used in combination with any other embodiment(s) herein.

The electronic device according to various example embodiments may be one of various types of electronic devices. The electronic device may include, for example, a communication device (e.g., a smartphone and network equipment), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC). Each "module" herein may include circuitry.

Various example embodiments as set forth herein may be implemented as software including one or more instructions that are stored in a storage medium (e.g., a memory of the controller 110) which is readable by a machine (e.g., the communication device 100). For example, a processor (e.g., a processor (including processing circuitry) of the controller 110) of the device (e.g., the communication device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded and/or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A communication apparatus comprising:

a radio frequency (RF) connector portion, comprising a connector, configured to be detachably coupled with a cable connector portion, comprising another connector, of one end of a cable configured to transmit an antenna signal;

at least one capacitor disposed near the RF connector portion; and a controller, including circuitry, configured to monitor a coupling state of the cable connector portion and the RF connector portion based at least on a capacitance of at least one of the capacitors.

2. The communication device of claim 1, wherein the capacitance of at least one of the capacitors is configured to be affected by a metal component of the cable connector, and is configured to change according to a positional relationship between the cable connector portion and at least one of the capacitors.

3. The communication device of claim 1, wherein at least one opening penetrating an inner area of the RF connector portion and an outer area of the RF connector portion is formed in the RF connector portion, and at least one of the capacitors is located near at least one of the openings.

4. The communication device of claim 3, wherein at least one of the capacitors is located in the inner area, when the cable connector portion and the RF connector portion are coupled in a form in which the cable connector portion surrounds the RF connector portion, and at least one of the capacitors is located in the outer area, when the cable connector portion and the RF connector portion are coupled in a form in which the RF connector portion surrounds the cable connector portion.

5. The communication device of claim 3, wherein at least one of the capacitors is configured to be affected by a metal component of the cable connector portion through the opening.

6. The communication device of claim 3, wherein at least one of the openings comprises a first opening and a second opening located opposite from each other in the RF connector portion, and at least one of the capacitors comprises a first capacitor located near the first opening and a second capacitor located near the second opening.

7. The communication device of claim 6, wherein the controller is configured to detect a bad coupling of the cable connector portion and the RF connector portion based at least on a change of a first capacitance of the first capacitor and a second capacitance of the second capacitor.

8. The communication device of claim 6, wherein the controller is configured to compare a first capacitance of the first capacitor and a second capacitance of the second capacitor each with a reference value, and determine that the coupling between the cable connector portion and the RF connector portion is bad based on at least one of the first capacitance and the second capacitance being less than the reference value.

9. The communication device of claim 8, further comprising:

a comparator configured to compare the first capacitance and the second capacitance each with the reference value, wherein the comparator may optionally be part of the controller.

10. The communication device of claim 1, wherein the RF connector portion is mounted on a surface of a printed circuit board (PCB) via at least a connector pad, and at least one of the capacitors is disposed to be near and spaced apart from the connector pad.

11. The communication device of claim 1, wherein the controller is configured to perform at least one of limiting a communication function and notifying a user of a bad coupling, when the coupling state of the cable connector portion and the RF connector portion is bad.

12. A communication device comprising:

a radio frequency (RF) connector portion, comprising a connector, configured to be coupled detachably with a cable connector portion, comprising a connector, of a cable configured to transmit an antenna signal, the RF connector portion further comprising a plurality of openings configured to penetrate an inner area and optionally an outer area;

a plurality of capacitors disposed near the plurality of openings in the inner area; and a controller, comprising circuitry, configured to monitor a coupling state of the cable connector portion and the RF connector portion based at least on a capacitance of the plurality of capacitors.

13. The communication device of claim 12, wherein the capacitance of the plurality of capacitors is configured to be affected by a metal component of the cable connector portion and change according to a positional relationship between the cable connector portion and the plurality of capacitors.

14. The communication device of claim 12, wherein the plurality of openings comprises a first opening and a second opening located opposite from each other in the inner area, and the plurality of capacitors comprises a first capacitor located near the first opening and a second capacitor located near the second opening.

15. The communication device of claim 14, wherein the controller is configured to compare at least one of a first capacitance of the first capacitor and a second capacitance of the first capacitor each with at least one reference value and determine that a coupling between the cable connector portion and the RF connector portion is bad based on at least one of the first capacitance and the second capacitance being less than the reference value.

16. The communication device of claim 15, further comprising:

a comparator configured to compare the first capacitance and the second capacitance each with the reference value.

17. The communication device of claim 12, wherein the RF connector portion is mounted on a surface of a printed circuit board (PCB) through at least a connector pad, and the plurality of capacitors is disposed to be near and spaced apart from the connector pad.

* * * * *